United States Patent Office 3,664,722
Patented May 23, 1972

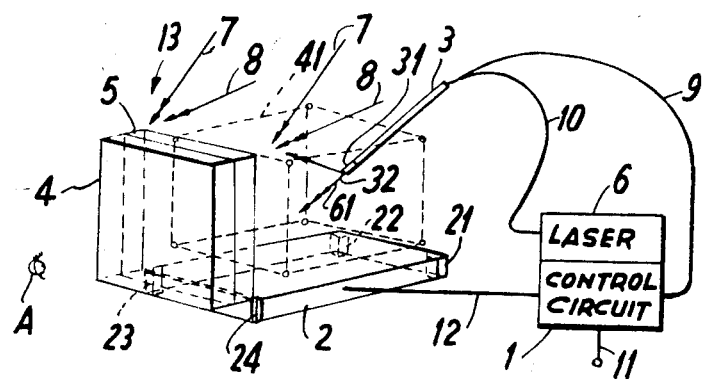

3,664,722
THREE-DIMENSIONAL POSITION INDICATOR
AND DETECTOR DEVICE
Kazuo Kiji, Nobuo Nishida, and Mitsuhito Sakaguchi,
Tokyo, Japan, assignors to Nippon Electric Co., Ltd.,
Minato-ku, Tokyo, Japan
Filed Sept. 22, 1970, Ser. No. 74,299
Claims priority, application Japan, Sept. 25, 1969,
44/75,804
Int. Cl. G02b 27/22
U.S. Cl. 350—3.5                                         4 Claims

ABSTRACT OF THE DISCLOSURE

A three-dimensional indicator and detector includes a movable indicator and a device for generating digital signals corresponding of the indicator position. An image of a three-dimensional coordinate system is formed on a plate, and the locus of movement of the indicator in that system can be viewed through the hologram plate on a real-time basis.

---

The present invention relates to a position detector device for use as an input device in an electronic computer or the like, and more particularly, to a three-dimensional position indicator and detector device.

A light pen and a tablet have heretofore been commonly used for detecting a position on a two-dimensional space and for encoding a hand written information of the two-dimensional space. However, these devices are not able to detect a position in a three-dimensional space.

A device making use of an ultrasonic unit for detecting a position in a three-dimensional space is described at pages 223 and 227 of the "Proceedings-Fall Joint Computer Conference" issued in 1966. The three-dimensional position detector device is called a "Lincoln Wand" and comprises four ultrasonic oscillators disposed at the four corners of one plane and an ultrasonic microphone which is freely movable in a space above that plane. That device is constructed in a manner such that ultrasonic waves are generated successively at predetermined time intervals from the four ultrasonic oscillators and are received by the microphone. On the basis of the time periods from the beginnings of oscillation of the respective ultrasonic oscillators to the receiving of the waves at the microphone and their mutual time differences, the three-dimensional position of the microphone above the plane may be determined and transmitted in the form of digital signals.

In the "Lincoln Wand," when the microphone is moved around within the space above the one plane, the three dimensional locus of that movement can be obtained as digital signals, and therefore, coded information of any arbitrary hand-written, three-dimensional figure by the microphone may be applied to an information processing system such as a digital computer and the like. However, since the three-dimensional figure depicted in the space by the movement of the microphone does not remain, and there is nothing to indicate the reference positions, it is difficult to accurately depict the desired figure.

On the other hand, although an accurate figure may be depicted if a model having a contour equal to that of the desired figure is disposed in the space, and if the microphone is slidingly moved along the surface of the model, difficulties may arise in the event that the model intervenes between the microphone and the oscillators so that the ultrasonic wave cannot be fed to the microphone as an input. Even if the ultrasonic wave could be fed to the microphone as an input, it would not have passed the straight line path between the microphone and the oscillator, and consequently, the position of the microphone may possibly be inaccurately detected.

It is an object of the invention to provide an improved three-dimensional position indicator in which the drawbacks of the "Lincoln Wand" are substantially eliminated.

It is another object of the invention to provide a three-dimensional position indicator and deterctor device, in which a three-dimensional coordinate system is recorded by holographic techniques to give reference positions of a three-dimensional figure to be depicted within a space, so that the three-dimensional figure can be easily and accurately depicted.

It is a further object of the invention to provide a three-dimensional position indicator and detector device, which enables an image of a locus depicted within a space to be displayed, and to depict a three-dimensional figure while looking at the displayed image.

According to the present invention, a three-dimensional indicator and detector device comprises an indicator for indicating a position within an indicating space above a confined plane, and means for identifying the position in that space indicated by the indicator to transmit digital signals as an output. The device includes a light transparent hologram plate having an image of a three-dimensional coordinate system recorded therein. A real time image recording medium is superposed on the hologram plate and a first coherent light source illuminates the real time image recording medium. A monochromatic parallel light source is provided for reading out the three-dimensional coordinate system in the hologram plate, along with a second coherent light source. The hologram plate is disposed so that the image of the three-dimensional coordinate system read out of the hologram plate is reproduced within the indicating space.

According to the present invention, since the position indicated by the indicator can be visually confirmed due to the fact that the image of the three-dimensional coordinate system is reproduced within the indicating space, the depiction of a figure within a three-dimensional space is greatly facilitated.

Furthermore, according to the present invention, since the first coherent light beam and the second coherent light beam cause interference with each other on the real time recording medium, and the interference fringe is temporarily recorded on the real time recording medium, the monochromatic parallel light illuminated onto the medium in advance is diffracted by the interference fringe, and the image at the emitting end of the second coherent light beam may thus be obtained as a diffraction image.

Accordingly, the locus of movement in the three-dimensional space of the emitting end of the second coherent light beam in accordance with the movement of the indicator in the three-dimenisonal space may be obtained as a diffraction image, so that the figure depicted within the space by means of the indicator may be visually identified. As a result, a desired figure may be easily and accurately depicted within the space.

Still further, according to the present invention, since the three-dimensional position of the indicator means which depicts the desired figure accurately within the space is converted into digital signals, the three-dimensional figure depicted within the space can be obtained in the form of a series of digital signals.

The present invention will be described with reference to one embodiment thereof illustrated in the signal figure which is a perspective view in schematic form of the position indicator and detector, in which the above-mentioned "Lincoln Wand" is employed as a three-dimensional position detector and photochromic glass is employed as the real time recording medium.

In the embodiment illustrated, a control circuit 1 for a "Lincoln Wand" is connected by a line 12 to a flat plate 2 having ultrasonic oscillators 21, 22, 23 and 24 respectively disposed at its four corners, and an indicator rod 3 has an ultrasonic microphone 31 attached to one of its ends. Indicator rod 3 is connected to control circuit 1 by a line 9 and to a coherent light source such as a laser 6 by a flexible photoguide 10.

Control circuit 1 controls the operation of oscillators 21–24 so as to cause these oscillators to successively generate ultrasonic pulses for a predetermined period of time at predetermined time intervals. Control circuit 1 receives an output from the ultrasonic microphone 31 via line 9, and operates to calculate the distances between the ultrasonic microphone 31 and the respective oscillators 21–24 respectively, on the basis of the time interval between the time of the initiation of the generation of the ultrasonic pulses from oscillators 21–24, respectively, to the time of receiving the ultrasonic pulses. Control circuit 1 transmits the positional information within the space of ultrasonic microphone 31 through its output terminal 11 in the form of digital signals. The design and manner of operation of control circuit 1 is believed to be well within the skill of those skilled in the art and is thus not further described herein.

A transparent hologram plate 4 having a three-dimensional coordinate system thereon is disposed vertically in front of flat plate 2 and a plate of photochromic glass 5 is disposed behind hologram plate 4 in a superposed relationship. The laser light beam generated by laser 6 is emitted from an extremity 32 of the indicator rod 3 through photoguide 10 which may be, for example, a self-focusing optical fiber. A light 13, such as a near ultraviolet light, activates the photochromic glass and a coherent light beam 7 bleaches the blackened photochromic glass and may be, for instance, a beam emitted from the laser light source 6. A monochromatic parallel light beam 8 is employed to read out the record in hologram plate 4. By illuminating hologram plate 4 with light beam 8 for read-out use, a reproduced image of the three-dimensional coordinate system 41 can be seen behind the hologram plate 4 as viewed from its forward position A, that is, within the space above the flat plate 2.

The operation of the device of the present invention is now described.

As is well known with reference to the above-mentioned "Lincoln Wand," when indicator rod 3 is moved, the position of each special point along the locus of movement of the extremity of indicator rod 3 can be obtained in the form of digital signals from terminal 11 of control circuit 1. Accordingly, any three-dimensional figure depicted within the space by means of indicator rod 3, may be converted into digital signals.

On the other hand, photochromatic glass 5 when activated by near ultraviolet light 13, becomes semi-transparent when illuminated with coherent light beam 7, resulting in the transmission of the monochromatic parallel light beam 8. The monochromatic parallel light beam 8, after passing through the photochromic glass is projected onto hologram plate 4 and is diffracted thereby. This in turn produces a diffracted image of coordinate system 41. Under this state, if indicator rod 3 is moved while watching the diffracted image, that is, three-dimensional coordinate system 41 and indicator rod 3, from the front side of hologram plate 4, the locus of movement of the rod can then be known because it is seen through that portion of the coordinate system 41 through which the extremity of the indicator rod 3 has moved, and the three-dimensional figure can therefore be accurately depicted.

Then, as a second coherent light beam 61 is emitted from the extremity of indicator rod 3, coherent light beam 61 and the first coherent light beam 7 cause interference on photochromic glass plate 5, and thereby temporarily form a hologram on glass plate 5. On the other hand, since photochromic glass plate 5 is illuminated with monochromatic parallel light beam 8, the latter serves to read out the hologram formed on the photochromic glass plate.

Since this operation continues successively in accordance with the movement of indicator rod 3, the locus of movement of the extremity of rod 3 can be observed as an image reproduced by the hologram in the form of a line of light. As a result, the figure can be detected while the figure depicted within the space by means of the extremity of the indictor rod 3 is being observed on a real time basis, so that the three-dimensional figure can be more accurately depicted.

Consequently, according to the embodiment of the present invention herein described any desired three-dimensional figure can be depicted accurately, and that figure can also be readily converted into digital signals.

It is necessary that the coherent light beam 7 be a light having a wavelength adapted to bleach the photochromic glass, and normally a near infrared light is employed therefor. As the monochromatic parallel light beam 8 used for reading out the hologram, it is necessary to employ a visual light for beam 8. Furthermore, in order that coherent light beam 6 cause interference with coherent light beam 7 so as to form a hologram on photochromic glass plate 5, it is necessary to use a light of the same wavelength as coherent light beam 7 for coherent light beam 61.

In this connection, although the three-dimensional coordinate system recorded in hologram plate 4 was a single cubic lattice in the case of the above described embodiment, it may also be a coordinate system having a configuration consisting of a plurality of piled cubic lattices.

Furthermore, while the ultrasonic oscillators 21 to 24 were affixed at the four corners of the plane, and a "Lincoln Wand" of a structure in which an ultrasonic microphone is mounted to the indicator rod as the means for detecting the position in the three-dimensional space has been herein particularly described, it is obvious that one ultrasonic oscillator may be mounted to the extremity of the indicator rod and a plurality (for instance, four) of ultrasonic microphones may be disposed on one plane with the same effect and advantages obtainable as that of the described embodiment. Moreover, the device should not be limited to that actually described which makes use of the ultrasonic wave, but instead any other type of device, which can detect the position in a three-dimensional space and convert it into digital signals, may be employed.

Thus while only a single embodiment of the present invention has been herein specifically described it will be apparent that modifications may be made therein without departing from the spirit and the scope of the invention.

We claim:

1. A three-dimensional indicator apparatus comprising means for indicating a position within an indicating space, a light transparent halogram plate having an image of a recording medium superposed on said hologram plate, a near ultraviolet light source for activating said image recording medium, a source of a first coherent light beam for bleaching said medium, a monochromatic parallel light source for reading out the three-dimensional coordinate system recorded in said hologram plate and a source of a second coherent light beam secured to the extremity of said indicating means, said hologram plate being disposed so that the image of the three-dimensional coordinate system read out of said hologram plate is reproduced within said indicating space, said first coherent light beam and said second coherent light beam being of substantially the same wavelength so that a hologram is formed on said recording medium by means of said first and second coherent light beams incident thereon, the hologram on said recording medium being read out by said monochromatic parallel light bean and being reproduced within said indicating space simultaneously with the formation of the hologram on said recording medium so that a locus of the extremity of said image indicating means is viewable simultaneously with the movement of said indicating means.

2. The apparatus of claim 1, further comprising circuit means coupled to said indicating means for generating a digital signal corresponding to the position thereof.

3. The apparatus of claim 1, further comprising a laser, and flexible optical transmission means coupled to said laser and to said source of said second coherent beam on said indicating means.

4. The apparatus of claim 3, in which said recording medium is a photochromic plate.

References Cited

FOREIGN PATENTS 1,532,389   6/1968   France _____ 350—3.5

OTHER REFERENCES

Spitz et al., 262 C. R. Acad. Sc. Paris, 758–760, March 1966 (350—3.5).

Mikaeliane et al., QE-4 IEEE Journal of Quantum Electronics, 757–762, November 1968 (350—3.5).

DAVID SCHONBERG, Primary Examiner

R. L. SHERMAN, Assistant Examiner

U.S. Cl. X.R.

340—324 R.